United States Patent [19]
Phaal

[11] Patent Number: 6,055,564
[45] Date of Patent: Apr. 25, 2000

[54] ADMISSION CONTROL WHERE PRIORITY INDICATOR IS USED TO DISCRIMINATE BETWEEN MESSAGES

[75] Inventor: Peter Phaal, San Francisco, Calif.

[73] Assignee: Hewlett Packard Company, Palo Alto, Calif.

[21] Appl. No.: 09/038,657

[22] Filed: Mar. 11, 1998

[51] Int. Cl.[7] .................................................. G06F 15/16
[52] U.S. Cl. .......................................... 709/207; 709/217
[58] Field of Search .................................. 709/207, 217, 709/219, 223, 224, 239

[56] References Cited

U.S. PATENT DOCUMENTS

| | | | |
|---|---|---|---|
| 5,006,978 | 4/1991 | Neches | 709/102 |
| 5,218,676 | 6/1993 | Ben-Ayed et al. | 709/240 |
| 5,377,354 | 12/1994 | Scannell et al. | 709/103 |
| 5,481,312 | 1/1996 | Cash et al. | 348/845.2 |
| 5,617,541 | 4/1997 | Albanese et al. | 709/207 |
| 5,623,603 | 4/1997 | Jiang et al. | 709/207 |
| 5,699,521 | 12/1997 | Iizuka et al. | 709/207 |
| 5,799,002 | 8/1998 | Krishnan | 370/234 |
| 5,826,031 | 10/1998 | Nielsen | 709/207 |
| 5,889,951 | 3/1999 | Lombardi | 709/219 |

*Primary Examiner*—Zarni Maung
*Attorney, Agent, or Firm*—Marc P. Schuyler

[57] ABSTRACT

This disclosure provides for admission control with multiple classes of service and priority processing. An admission control system preferably admits incoming messages which are part of a session-in progress. As to messages representing new sessions, the admission control system admits such messages on the basis of priority or class assigned to them, or otherwise discriminates between messages stored in a message queue based on priority. In a preferred embodiment, if server resources become strained, the admission control system can defer messages in order of lowest priority or if allocated class resources have been exceeded. In one embodiment, messages are assigned different status for two web site providers paying for different levels of service available, such that as server resources become stretched, one web site will receive better quality of service than the second web site. For deferred messages, the server-based system determines when priority access can later be provided to the particular client and transmits to the client an indication of that time. One example uses a downloaded web page to automatically cause a client browser to later automatically access the host on a priority basis.

19 Claims, 3 Drawing Sheets

ADMISSION CONTROL WHERE PRIORITY INDICATOR IS USED TO DISCRIMINATE BETWEEN MESSAGES

The present invention relates to communications between computers and, more particularly, to enhancing service in applications where one computer receives and processes messages from other computers.

BACKGROUND

Several protocols exist in which one computer (a "host") receives and processes messages from a number of other computers ("clients"). For example, in applications involving the world-wide web, a server can receive and process many concurrent messages from different personal computer users; in this example, the server would be the "host" while each personal computer would be a "client."

Many of these protocols are referred to as "stateless," meaning that a host inherently processes each message without regard to any particular client or past messages which have been transmitted between host and client. Examples of stateless protocols include Hypertext Transfer Protocol ("HTTP"), Internet Protocol, User Datagram Protocol, Simple Mail Transfer Protocol, and Network File System Protocol. As implied by this description, typical stateless protocols inherently treat all messages as the same, processing them in the order received.

Frequently, however, there may be one or more functions which are considered relatively more important or urgent than others. For example, in some applications involving the world-wide web (the "web"), it might be considered more important to receive and process a commercial transaction than to permit browsing of certain types of information. Functions can also be considered relatively more important or urgent dependent on context; for example, as host processing resources become stretched, a user of a client system may become more frustrated in trying to access information or complete a transaction. Such a user may submit a request several times if an inadequate response is received, heightening frustration, and it may be desired to give such users priority in host processing.

One technique which has evolved in connection with reducing user frustration involves applying "admission control," where only a certain number of client messages are processed ("admitted") and the remainder are refused; of the messages which are in fact admitted, all are ideally handled in an expedient manner without degradation of quality of service as to those admitted messages. An advantage of this technique is that admission control can be implemented in software, thus facilitating quick, inexpensive use with little advance notice. Unfortunately, typical admission control mechanisms operate by admitting messages on a message-by-message basis and, so, these typical admission control messages do not provide an adequate solution for multiple-message sessions. The fact that messages are stateless to a host does not imply that each message sent by a client system is independent of other messages sent by the client system, and it does little to relieve user frustration if one message in a series of related messages is admitted, while the others are delayed or refused admission.

Thus, admission control generally provides a way to prioritize messages which are received first; as long as processing resources are available, received messages are processed. As soon as processing resources become scarce, however, messages are refused admission to the host.

Admission control typically does not provide a means of discriminating between different functions offered by a host, and typically offer no guarantee for completion of sessions. Also, messages which are not admitted to the host are typically not handled at all, such that a client is not informed that the request has been refused or the client, if informed, is simply asked to "try again later." A refused client must usually try repeatedly to obtain service with no guarantee that future requests will be processed.

A definite need exists for a host processing system which can prioritize messages, either based on function or context. With such a system, a host could implement different types of service for different functions, for example, different processing tasks or different destinations such as web sites. Additionally, a need exists for an improved host processing system which can improve quality of service by admitting entire sessions, deferring entire sessions, and prioritize handling of deferred sessions when they are re-submitted. With a system of this type, admission control would at least provide a reliable means of finishing each session with high quality of service. A need further exists for a system that provides some level of service to all clients, including those which have been refused admission. The present invention solves these needs and provides further, related advantages.

SUMMARY

The present invention provides a host processing system having multiple classes of service. Using the present invention, a host processing system can accord priority in processing sessions which have been previously deferred, or which correspond to a web site or processing task that is considered more important that other functions of the same host processing system. The present invention thus permits allocation of processing resources during times of stress to be concentrated on those functions are considered to have priority. The preferred host processing system is also session-based, such that once a message is admitted, all related messages are processed on a priority basis. By facilitating quick completion of admitted sessions, and providing an effective mechanism for handling deferred clients, the present invention provides a low-cost mechanism for significantly enhancing service in host processing applications, such as involving the web.

One form of the invention provides a host processing system which allocates incoming messages according to an indicator of priority or class ("priority indicator") associated with each message; the indicator can be assigned by a host, by an admission control system, by the client itself, or by the message's ultimate destination. In this form of the invention, messages having a relatively high associated level of priority received favored treatment over messages having lower priority. For example, messages in a queue can be reordered according to priority. Messages can also be, when host processing resources become scarce, admitted or rejected based upon priority. The indicator can be a specific alpha-numeric field associated with each message, and it can also be in the form of presence or absence of a specific field (indicating a priority and non-priority, respectively).

A second form of the invention provides for a host processing system having admission control, using an admission control gateway and a resource monitor which regulates messages processed by a host. When the admission control gateway receives a message that calls for a new client session, the gateway uses the resource monitor to help determine whether a processing threshold has been reached; if the threshold has been reached or surpassed, the message is checked to determine if a new session represented by the message is to receive priority.

In more detailed features of this second form of the invention, admission control can be used to interrupt one or more sessions of lower priority (or from an over-represented class) and defer them, making room for processing of the session of higher priority. Deferred messages can also be specially handled; for example, deferred messages can be passed to a deferral manager to formulate a response to the particular client. A scheduler can then be checked to determine a time when the host can expect to have processing resources available, and the deferral manager responsively formulates a time indication which tells a client system when it can expect to gain admission to the host. At the same time, the deferral manager can increase the priority of the deferred message, such that on the next submission, the message will be accorded a higher priority status. In one embodiment, the admission control gateway can assign more than two levels of priority, such that messages deferred twice are accorded higher priority than messages deferred once, and so on.

Using a priority indicator (or lack thereof) associated with each message, the present invention provides a mechanism for sorting messages according to priority and treating them differently, whether based on host processing function or prior deferral.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

DETAILED DESCRIPTION

Figure 1:
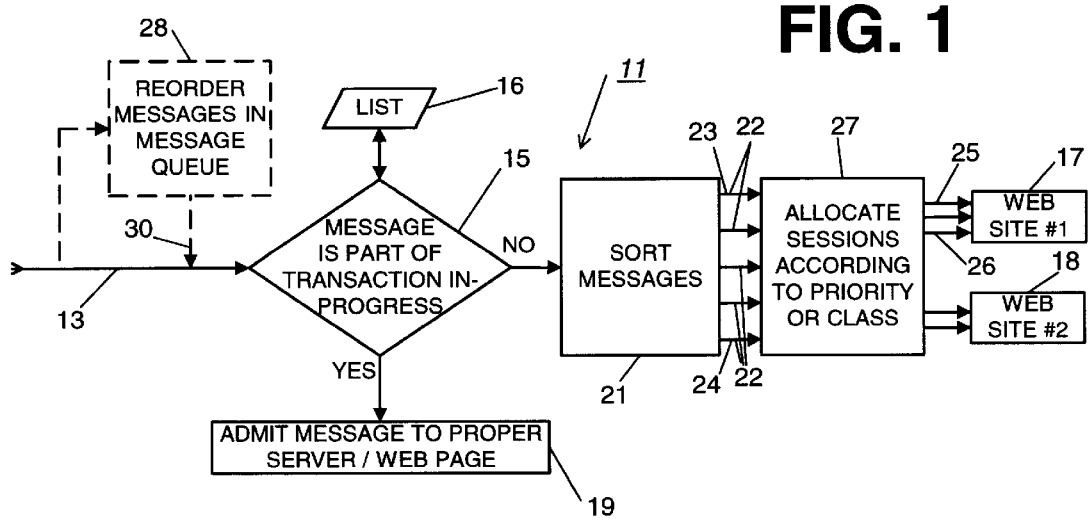
FIG. 1 is a block diagram showing implementation of multiple classes of service, including allocation of messages according to priority (including message queue reordering), determination of whether a message corresponds to a session in-progress, and allocation of new sessions for messages not corresponding to a session in-progress. Message queue reordering presents an optional feature and, so, is indicated in dashed lines in FIG. 1.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a host processing system, namely, one which provides priority access based on multiple classes of service, deferral of certain messages, and a web page downloaded to a client having automatic or elective attempts to later attain access. The invention, however, may also be applied to other types of systems as well.

I. Introduction to the Principal Parts

The preferred embodiment is a host processing system which allocates incoming messages to one or more processing tasks according to priority or class of service (each referred to as "priority"). "Priority" is preferably associated with each message by an admission control system, by a message itself, by a client system or by the server. The term "priority" includes situations where a specific indicator of class is embedded in packet information for each message, or a client cookie, as well as situations where some messages have no specific associated field (e.g., indicating a lack of priority relative to other specific messages). In one preferred embodiment, admission control can be used to assign priority to a message as received depending upon the ultimate destination of the message, for example, a particular web site. In another preferred embodiment, priority can be assigned to messages upon deferral (because the server is too busy to handle new sessions represented by the messages) such that when later re-submitted, the messages are then-handled on a priority basis. In this latter embodiment, deferred messages can be specifically assigned an appointment for re-submission at a time when it is thought that the server can guarantee priority processing to the message. In this latter embodiment, admission control is used to format a message response to the client, to inform the client's user that access has been deferred, and to accord the client a means of later obtaining access on a priority basis if the client contacts the host processing system again at the proper time. Finally, priority can be used to re-assign order of messages in a message queue, such that messages receiving priority are always processed very quickly.

Of the aforementioned embodiments, the preferred embodiment which will be primarily discussed below is a host processing system which includes admission control functions. That is to say, the preferred embodiment includes an admission control system that normally admits and rejects messages from a client system to a server, but if processing resources of the server are strained, the admission control system admits messages based on priority. At the client system, a user is preferably afforded a means of automatically contacting the server again, once the appointed time has been reached. In the preferred embodiment, admission control software operates principally on a server and formats a special web page which is downloaded to the client as part of a deferral message. This special web page provides a countdown function, visible to the client's user, which indicates time until re-submission in minutes or seconds; if the client closes the browser or uses it to contact a different web page, the web page is disabled and the client will not automatically contact the server (in the preferred embodiment). This implementation is preferred, because it can be implemented entirely in software on the server side (including formation of the special web page which is downloaded to the client).

FIG. 1 illustrates general processing of incoming messages applied by a preferred host processing system 11. In particular, messages from a stream of incoming messages 13 are interrogated to determine whether or not they represent a session in-progress, and messages corresponding to sessions in-progress are admitted to the server, as represented by decision block 15 and function block 19. Sessions in-progress are verified by comparing packet information for a particular message with a list of sessions in-progress (including client and server identification) which is stored in a buffer 16 by the admission control system. For messages not corresponding to sessions in-progress, the host processing system determines priority of the messages, and allocates new sessions and corresponding messages 22 according to priority (as indicated by function blocks 21 and 27, respectively). In FIG. 1, the reference numeral 23 is used to designate messages and sessions having a relatively higher priority, and the reference numeral 24 is used to designate messages and sessions having a relatively lower priority.

As indicated earlier, messages may receive different priority based on final destination, for example, two different web sites 17 and 18. In such an embodiment, each web site can be assigned a specific percentage of processing resources, for example, in a seventy percent/thirty percent split. Different priorities can also be assigned to a single processing task or destination, such that the server admits messages with higher priority 25 at the expense of lower priority messages 26. In the case of resources split between two web sites, a new session can be admitted for a web site not using its full resource allocation at the expense of a second web site using more than its allocated share. "Priority" may also be optionally used to speed up certain functions of the host processing system relative to others, by reordering messages in a message queue according to priority and passing the messages having highest priority to a server for processing, as indicated by phantom blocks 28 and 30, respectively. As an example of this latter function, the admission control system can specifically look at a message's packet information (or look at a client cookie) and reorder messages based on client identity, ultimate destination, or a priority indicator field associated with the message.

Figure 2:
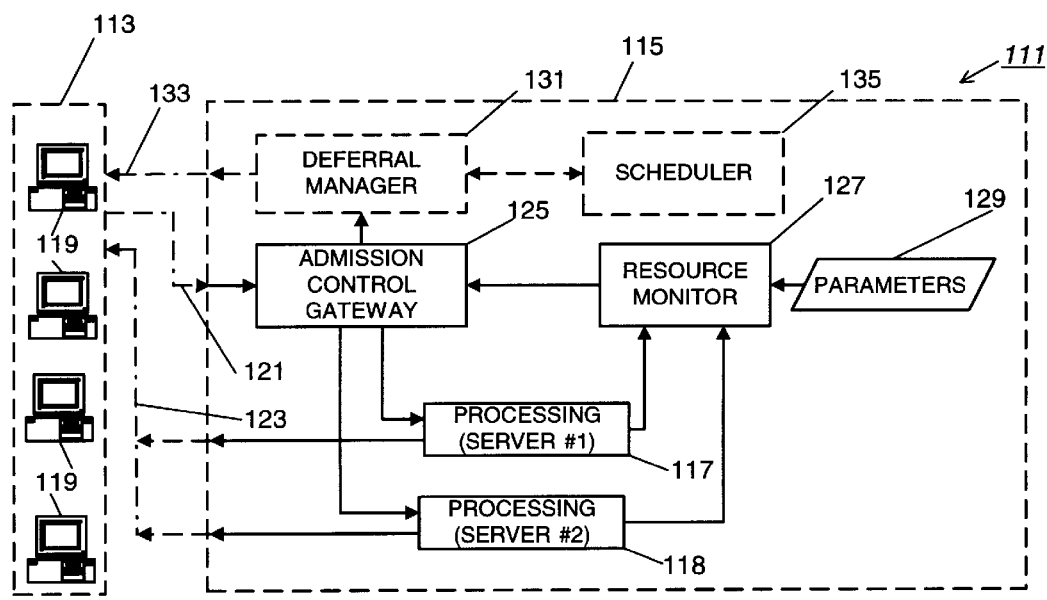
FIG. 2 is a block diagram showing a host processing system and preferred use of admission control which implements principles indicated in FIG. 1. In particular, FIG. 2 at its left shows a plurality of clients which may communicate with a host processing system, seen at the right side of FIG. 2.

FIG. 2 shows a block diagram showing additional detail regarding a preferred host processing system 111. In particular, the diagram illustrates a hypothetical connection between a client side 113 and a host side 115. The host side includes one or more servers 117 and 118, each of which may have one or more web sites. Notably, it is common to find configurations where several servers are arranged in parallel to share processing responsibility for a single web site (such as a "round-robin" configuration), but for the subsequent discussion it will be assumed that only one server is present; the present invention can be implemented on multiple-server systems as well. The client side 113 may include many individual personal computers 119, which may each contact the host side 115 via a complicated network of communications paths and nodes. Irrespective of the particular communication path, the host side 115 receives a stream of incoming messages 121 which may access one or more web sites stored on the server 117 or 118, and provides a stream of outgoing response messages 123 in response.

Admission control is effected by passing the incoming messages 121 to an admission control gateway 125, which determines whether to admit the messages to the server 117. Messages corresponding to sessions in-progress are preferably always admitted, such that the user of a client can reliably expect a transaction with a server, once initiated, will be completed. It is believed that ensuring completion of sessions in-progress will promote less user frustration, e.g., commercial transactions over the web, once begun, will be reliably completed to satisfaction of the user. At the same time, rather than stretch processing resources of the server, if too many new messages are received, the admission control mechanism preferably defers at least some amount of those messages, such that sessions in-progress can be reliably and quickly completed through the use of un-stretched server resources. A mechanism for responding to deferred clients preferably includes an affirmative statement about admittance, e.g., that the client will later be admitted at a time specific, to avoid too much frustration on the part of users of deferred clients.

The admission control system of the preferred embodiment includes a resource monitor 127, which provides information on current use of server resources. The resource monitor is typically a set of code that uses a standard call function provided by most server protocols; the call function returns a value having a particular format, depending upon the server. For example, some servers will return a percentage, indicating present resources which are "occupied," while other servers may return an numeric value which is not based on a decimal scale (e.g., not a number from one to ten or one to one-hundred).

A message received by the admission control gateway 125 is first analyzed to determine whether it corresponds to a session in-progress. If a session has already been established (and the newly-received message is a part of a continuing transaction between the server and a particular client), then the message is preferably always admitted to the server. If not, the resource monitor 127 can be used to determine whether the message is to be admitted as the start of a new session. To this effect, the resource monitor 127 is coupled to a set of one or more parameters 129 which are stored in a buffer. These parameters define a desired maximum load (or threshold for deferral) which may be static or may vary, depending upon the embodiment of admission control. For example, one embodiment uses reserved time slots which can be allocated to deferred messages; if a large volume of deferred messages are scheduled for processing on a priority basis at three O'clock, a stored parameter can be set for three O'clock to define a lower threshold, such that more messages (which are non-priority messages) are deferred than normal at that time. In the preferred embodiment, a static figure is used (e.g., eighty percent), primarily for simplicity in implementation. The admission control gateway 125 compares the set of at least one parameter with the result of the call function and, if the comparison indicates that server processing resources have exceeded the threshold, then new sessions not having priority are deferred.

Since the admission control gateway 125 defers some messages corresponding to new sessions when resources are stretched, it is desired to provide some reply to a client system which submitted the message, in order that the user of the client system will not become frustrated or continually re-submit the message (thereby further overloading server resources). To accomplish this end, the admission control system 111 further includes a deferral manager 131, which formats and provides a response message 133 to the client system which submitted the deferred message. Preferably, the deferral manager 131 is coupled to a scheduler 135 which, together with the deferral manager, calculates a later time when it can be expected that the deferred message can be processed by the server 117. The scheduler has many possible implementations for obtaining such information. For example, the scheduler can compile statistics based on day-to-day operation of the server and times when the processing resources of the server tend to be less strained; in this example, the scheduler could determine that a particular server is "less busy" from twelve O'clock noon until one O'clock P.M., and could defer a client system until twelve O'clock noon and the one hour time range thereafter. Alternatively, the scheduler could simply set "appointments" (e.g., two for every five minutes) and simply return to the deferral manager 131 a time for the next available appointment. In the preferred embodiment, the scheduler uses the latter function and defers messages for a minimum predetermined amount of time, e.g., 300 seconds as indicated by Table I, below; in conjunction with a time set by a web page which is downloaded to the client, the client's message is later accepted on a priority basis if the client contacts the server within a defined interval following the time. Implementation of the scheduler is effected in the preferred embodiment via software.

A number of mechanisms can also be implemented such that the admission control system 111 recognizes a deferred message as a priority message following re-submission. In the preferred embodiment, the deferral manager 131 generates a "key" in the form of a "cookie" which the admission control system writes to memory of the client system. When access is again requested by the client system, the admission control gateway 125 interrogates the client system to determine whether the cookie is present and, if so, the admission control gateway accords priority status to a message from the client system at that time, in terms of generating a new session. In addition to writing the cookie to the client system, the deferral manager 131 also generates an informative web page which it downloads to the client's browser. This web page visually displays to a user of the client system an informative text message, e.g., "We're sorry, but our server is temporarily serving other clients; to better assist you, we have scheduled an appointment for your transaction, and if you do not exit this web page, your browser will automatically contact us in 23 seconds."

The numeric figure in the above text message is a countdown time, and the web page generated by the deferral manager automatically establishes a countdown mechanism on the client system. The countdown time is continually displayed to a user, and once the time reaches zero, the web page automatically directs the browser to the same URL which resulted in the deferral, and the admission control gateway 125 checks for the presence of the aforementioned cookie.

Certain alternative implementations are also possible, such as where a web page is not used; these embodiments include systems where the browser is a modified browser on the client side, which includes a buffer (not visible to the client's user) for storing a uniform resource locator ("URL") of a server which has deferred access, together with an appointment time. The modified browser is effective to (in the "background" as far as concerns the user) automatically detect when the appointed time has been reached and then cause the browser to submit a priority message for processing by the client. Ideally, the user is afforded in this embodiment an election at some point during the process, as to whether the user wishes to establish deferred access. The browser is then directed to automatically open up a separate window for each new session initialized via the buffer. Ideally also, the buffer of the modified browser can store indications for several deferred, priority sessions, and the modified browser is effective to order such indications such that they are used to establish deferred sessions at the proper times, regardless of the order in which the indications are received.

With the principle features of the preferred embodiment (and some of the alternative embodiments) introduced, implementation of the preferred embodiment will now be further described.

II. Server Side Admission Control

Figure 3:
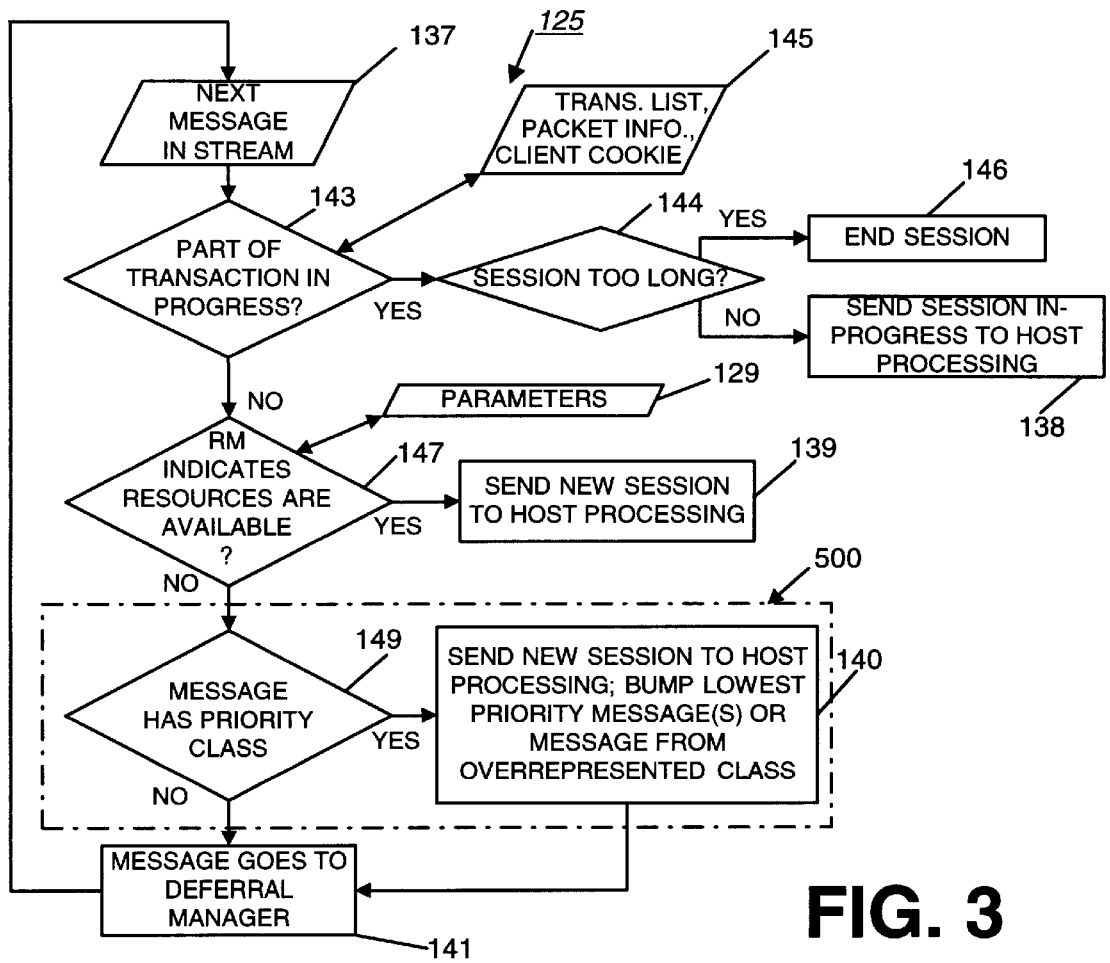
FIG. 3 is a block diagram that indicates operation of an admission control gateway, seen in FIG. 2.
Figure 4:
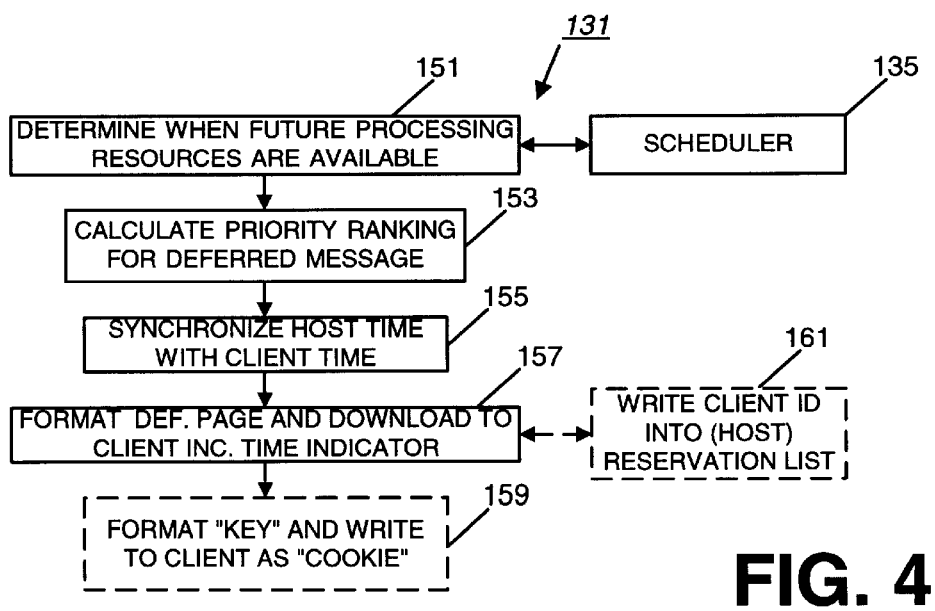
FIG. 4 is a block diagram that indicates operation of a deferral manager, seen in FIG. 2.

FIGS. 3 and 4 are used to illustrate operation of the admission control on the server side in additional detail. In particular, FIG. 3 shows additional detail for the operation of the admission control gateway 125, whereas FIG. 4 shows additional detail regarding the operation of the deferral manager 131.

As seen in FIG. 3, the admission control gateway 125 processes each next message 137 in the stream by either sending the message to host processing (e.g., to the server), as indicated by the reference numerals 138, 139 and 140, or by sending the message to the deferral manager, as indicated by the reference numeral 141.

The admission control gateway first interrogates each message to determine whether the message is part of a session in-progress, as indicated by a software block 143. Several different types of data can be used for this purpose, as indicated by a data block 145. First, the admission control gateway can maintain a transaction list which includes information on the requesting client and the session at-issue; the admission control gateway monitors header information for each message and simply determines whether information corresponds to a list of sessions in-progress. Second, the admission control gateway can simply look for a particular password or identifier provided with the packet information for the message. Third, the admission control gateway can also look for a client cookie which has been written to the requesting client, by simply interrogating the client via a response message to determine whether the cookie is present. Of these processes, a transaction list is preferably used as the most expedient of these processes.

For sessions which are in progress, the admission control gateway 125 applies criteria to limit overall session length (as represented by reference numeral 144 in FIG. 2), so as to ensure that all sessions are terminated as of some point in time. For example, as seen in Table I (below), session length may be capped to 1800 seconds, with the admission control gateway invalidating any session which exceeds that length of time, as designated by the reference numeral 146. When sessions are admitted, they are assigned to a class, and the class identifier is included in a cookie stored on the associated client system. The server or admission control system keeps statistics for each request processed, for example, statistics on the last 1000 requests (for each class, if multiple classes of priority are used). Typically, a server will not need to terminate sessions, but it (via the admission control system) will simply stop admitting sessions in an over-represented class and allow natural attrition to reduce its population. If this does not occur quickly enough then sessions are terminated by invalidating their session cookie. In each case where a cookie is used, alternative state tracking mechanisms can be used. The server could have a table of the states of the current sessions and simply update or read entries from that table. Sessions which have not been in-progress for an excessive length of time are passed along for processing, as indicated by the block 138.

If the message is not part of a transaction in-progress, the admission control gateway 125 can also admit the message as a new session if it is determined that the server has sufficient processing resources available, as determined by comparison with the set of parameters 129 (the determination is indicated in FIG. 3 by the reference numeral 147). The admission control gateway 125 can further admit the message if it is determined that the message corresponds to a message which has been previously deferred, as indicated by a decision block 149. In this regard, these two determinations can be performed in alternative order depending upon the particular implementation. For example, in an embodiment where reserved time slots are used and dynamic parameters 129 are used to regulate un-reserved (or contention) time slots, it is preferable to detect new sessions having reserved time slots so as to not reduce the number of contention slots available. In the preferred embodiment, specific slots are not used and the parameters 129 include a single, static threshold, with lowest priority (e.g., most recently received, non-priority) messages being deferred, even if already in-progress, if the server only has processing resources for priority messages. Consequently, the determinations can equivalently be performed in the preferred embodiment in the order indicated in FIG. 3. Notably, processing using priority classes is identified as a processing block by the reference numeral 500, and will be discussed further below. If the determinations do not result in admission of the message to the server, then the message is sent to the deferral manager, as indicated by the bottom most block 141 of FIG. 3.

The operation of the deferral manager 131 is indicated in FIG. 4, and results in the sending of a deferral message to the client system, and the creation of a priority identifier that permits re-submission of the deferred message on a priority basis. In the preferred embodiment, the deferral manager operates in communication with the scheduler 135 to determine a time when future processing resources of the server will be available on a priority basis for deferred messages (as indicated by a functional block 151 of FIG. 4). The code which implements the deferral manager then proceeds to calculate a priority ranking for the deferred message, as indicated by block 153 of FIG. 4. Only two classes of service are needed by the preferred embodiment, namely, for priority messages and for messages not having priority status, with additional distinctions made based upon newest session (i.e., a priority message representing the most recently commenced priority session is viewed as less important than priority sessions in-progress, and a non-priority message corresponding to the most recently commenced non-priority session is viewed as less important than other non-priority sessions in-progress). As a consequence, block 153 operates in the preferred embodiment by simply ascribing priority to any deferred message.

Importantly, in one preferred embodiment, a number of classes of service can be made available for messages and different web sites, each having different class or priority ranking (1 to n). For example, if a server is used to support the web sites of two companies, and one company pays a premium fee for support of a first web site, then messages directed to the first web site can be given priority when the server's overall processes are strained, priority including preferred access at the expense of messages directed to the second web site. Alternatively, if processing resources become very stretched, it is possible that a server could at a particular point in time be processing only priority messages, in which case a message representing new session could in some embodiments be deferred twice; using multiple classes of service, the twice-deferred message could receive a second step upward in priority, and so on.

The deferral manager 131 then proceeds with the optional step of synchronizing host time with client time (indicated by block 155). This process can be as simple as calculating a countdown time in seconds and downloading that information to the client system (as is done in the preferred embodiment), or in alternative implementations, the deferral manager can interrogate the client system to determine differences in time, and adjust the time indicator sent to the client accordingly. As indicated by block 157 of FIG. 3, the deferral manager 131 formats an informative message including the time indicator and sends this information to the client system, preferably including a message having a purpose to avoid user frustration (e.g., a message indicating that the client's request will be processed at a specific time, with automatic re-submission by the client's web browser). Preferably, the informative message is contained within a deferral web page which stores the URL of the server for which deferral occurred, and the deferral web page again submits the same URL at expiration of a countdown time.

The deferral manager 131 also stores an identifier of priority status for each deferred message, via one of two alternative mechanisms (each indicated by dashed lines in FIG. 3). First, the identifier can be formatted as a "key," such as a password or cookie written to a hard drive of the client system (indicated by reference numeral 159) which identifies priority status. Alternatively, the deferral manager can (as indicated by block 161 of FIG. 3) write the identifier into memory on the server side of the admission control system, as part of a list. Use of a cookie is preferred, since such an implementation minimizes the amount of processing time required of the deferral manager, hence provides for greater throughput in processing deferred messages if a large number of deferrals are occurring. The cookie should include a unique identifier for the particular server (or web site), and it should also be time-limited; the cookie can either include the time indicator itself (i.e., a cookie which varies from message-to-message), or it could be a unique value that changes each day, for example.

A. Scheduler Operations.

The scheduler may operate in any of a number of ways in order to optimize server processing. Preferably, the user of a client system should not have to wait long prior to re-submission of a message and, consequently, the preferred embodiment allocates appointments up to a predetermined number of deferred sessions per minute, and assigns messages as soon as possible after deferral. This predetermined number of sessions can be varied using a server side configuration screen [indicated in Table I, below]. The configuration screen also specifies an exclusion time during which is the minimum amount of time following deferral for a corresponding appointment.

In an example indicated in Table I, below, the minimum time before an appointment is indicated to be 300 seconds, with a maximum number of deferred sessions indicates as ten sessions per minute. In this example, if a total of 22 sessions were to be deferred at approximately 3:00 P.M. (and there was no backlog of deferred messages), the deferral manager 131 would provide priority to the first ten messages if they re-submitted their messages between 3:05 P.M. and 3:06 P.M., the next ten message between 3:06 P.M. and 3:07 P.M., and the final two messages between 3:07 P.M. and 3:08 P.M. If another message received at 3:01 P.M. was to be deferred, the message would receive priority between 3:07 P.M. and 3:08 P.M., together with the $21^{st}$ and $22^d$ messages referred to above. It the message were instead received at 3:04 P.M. (instead of at 3:02 P.M.), the deferral manager and scheduler would assign priority to the message between 3:09 P.M. and 3:10 P.M., even if there were no backlog of messages.

TABLE I (SAMPLE ADMISSION CONTROL CONFIGURATION SCREEN)

[About | Index | Statistics]
                        Web Flow Settings

Admit Sessions:

[ ] Shutdown in [600] seconds.
[ ] Always (disables dynamic admission control).
[X] If Load < [5.00]
End Sessions When:

[ ] interval between requests > [600] seconds.
[X] or, session duration > [1800] seconds.
Respond to Rejected Sessions with:

[ ] a redirect to [          ] (leave blank if no redirection required), and then if redirected request cannot be accepted or redirection is disabled, respond with:
[ ] Error
[X] Page [count_down.htm]
[X] Allocate up to [10] sessions per minute.
[ ] External
and then exclude them for [300] seconds.

As further indicated by Table I, the server side configuration screen provides for adjustment of maximum load prior to deferral, for admission control to be turned "off," and also permits a number of other options in controlling admission.

III. Client Side Admission Control.

Client side admission control is preferably achieved automatically by the admission control system, using the deferral manager to format and download to the client a web page that automatically redirects the client's browser back to the particular server when the proper time has been reached. Presently contemplated alternative implementations of client side admission control include: a pervasive program file, which launches either the client's web browser (if the client's browser has been such down) or an additional browser window (if the client's browser is active); and, a modified web browser which automatically stores several appointments for deferred server access.

Additional details regarding applications using multiple classes of service are discussed in U.S. patent application Ser. No. 09/038,868, for "Admission Control Mechanism with Messages Admitted or Deferred for Re-submission at a Later Time on a Priority Basis," for inventor Peter Phaal, filed on the same date as this disclosure, which is hereby incorporated by reference in its entirety, as though set forth herein.

IV. Use of Multiple Classes of Service.

Figure 5:
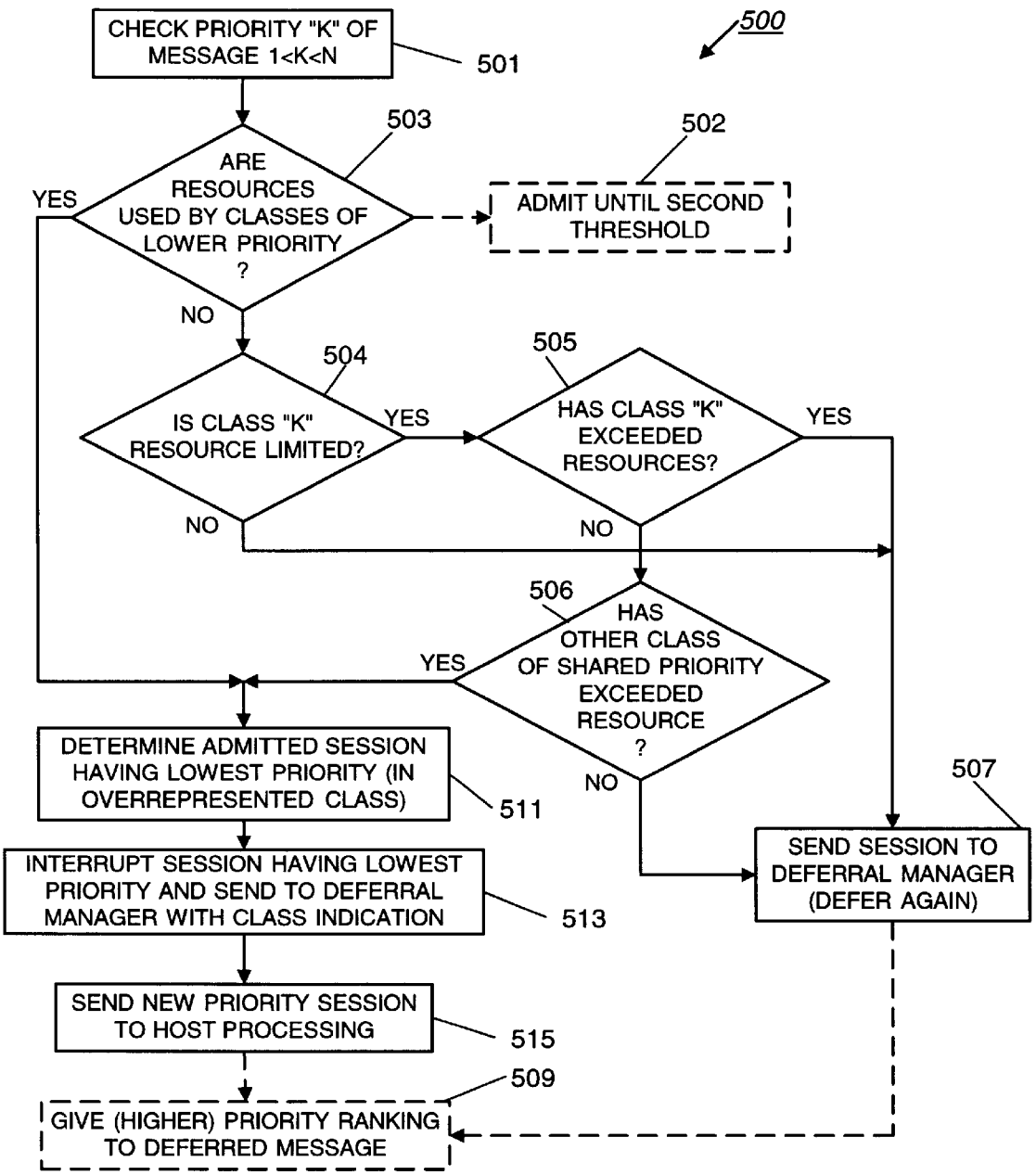
FIG. 5 is a flow diagram which indicates operation of a block 500 of FIG. 3, namely, a portion of the preferred admission control gateway which processes or defers new sessions based on assigned class of service.

FIG. 5 respectively indicates operation of the admission control gateway 125 in the case of multiple classes of service and provides an expanded view of block 500 seen in FIG. 3. The admission control gateway first checks the priority "k" of a message, which can vary from one to "n." The first processing block 501 of FIG. 5 returns the value "k" for a determination of whether the server has resources available to process the message as a new session.

The motivation for multiple classes can vary: for example, the admission control system can be designed to support multiple deferrals with a higher priority in admission given to those messages deferred more than one (such that messages deferred twice would be given priority over messages deferred once). The multiple classes can also be designed to support one or more web sites, where perhaps one web site provider is paying for a premium service for better service than another web site provider (or for the purpose of ensuring that multiple web site providers each are guaranteed a fair or allocated share of resources).

Four decision functions 503, 504, 505 and 506 determine whether processing resources can be "made available" for a newly-received message having class "k." It will be recalled that a block discussed above in connection with FIG. 3 determines whether processing resources are available and admits messages on that basis; consequently, when operation of the admission control gateway reaches the block 503, it has already been determined that the server has already exceeded its maximum load, and that no more processing resources are available. Consequently, it is first determined via decision block 503 whether a class of lower priority can be bumped to make available a session corresponding to a new message. Notably, one alternative embodiment which could be readily implemented would result in use of two thresholds, e.g., where a new session is admitted at block 503 instead of bumping sessions in-progress of lower priority, until a second threshold is reached (as per phantom block 502). The use of two thresholds in this manner permits temporarily exceeding a first threshold under the presumption that natural attrition among sessions will quickly reduce the number of sessions in-progress to again fall below the desired maximum load.

Whether this latter embodiment is implemented, the system preferably supports multiple classes having assigned maximum resources (for example, to two or more different web sites), with priority being determined depending on whether a class has exceeded its resources. As seen with reference to decision block 504, it is determined whether a class associated with a new message has been assigned limited resources; if so, it is determined whether class "k" is under-represented in use of CPU resources. As indicated by decision block 505, if acceptance of a new session represented by a current message would place class "k" beyond its allocated share of resources, then the new message is preferably immediately deferred, as indicated by function block 507. If session corresponding to a class of lower priority is in-progress, or if another class of limited resources has exceeds its allocated resources, then the system proceeds to determine whether a lower priority session can be bumped to make room for a new session, as indicated by decision blocks 503 and 506 and function blocks 511, 513 and 515. If no room can be made for a new session, for example, because there is no session of lower priority and no class for which allocated resources have been exceeded, then the newly-received message is sent to the deferral manager, as indicated by function block 507.

When bumping a session in-progress, the admission control gateway identifies a lower priority session in-progress and interrupts that session, sending it to the deferral manager to make room for the new, higher priority message (as designated by numerals 511 and 513, respectively). The newly-received, higher priority message is then admitted to the system as indicated by function block 515, while the deferral manager formats a deferral message corresponding to the lowest priority message which was deferred, and assigns it a higher priority and a later appointment. Optionally, for messages which have been deferred, the embodiment of FIG. 5 can increase the priority of a message to "k+1" as indicated by a function block 509 seen at the bottom of FIG. 5.

As can be seen by the foregoing description, the preferred embodiment presents a mechanism for sorting messages according to priority (including class status). Messages can be assigned priority based on previous deferral, and also based on intended destinations, such as a particular web site. Multiple functions of a host computer can also be prioritized, either on an absolute basis, or based on a determination that a particular class of functions have exceeded allocated resources.

In view of the foregoing description, various alternative embodiments of the present invention will occur to those having skill in electronics. For example, various software alternatives will also occur to those having programming skill which effects deferral of messages without departing from the spirit of the present invention. The admission control gateway, deferral manager and scheduler, above, are typically implemented with a single set of code having various arrangements of routines and subroutines, but some of these functions could also be implemented in hardware or firmware. Other mechanisms for assisting admission control on either the server side or the client side may be used instead of the mechanisms described above.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A host processing system that processes message from a stream of messages according to class status, comprising:
   a server; and
   an admission control gateway that
      receives the stream of messages,
      determines from an indicator associated with each message whether messages from the stream have been assigned priority status relative to other messages from the stream, and
      discriminates between messages in the stream having relatively higher priority at the expense of other messages in the stream;
   wherein the admission control gateway selectively rejects messages in the stream having relatively low priority, and does not pass such rejected messages to a server.

2. A host processing system according to claim 1, wherein:
   said host processing system further comprises a resource monitor, which monitors server processing resources and provides an indication thereof; and
   the admission control gateway, in response to an indication from the resource monitor that processing resources available to the server are scarce, rejects messages not corresponding to a session in-progress and not having a priority status relative to other messages.

3. A host processing system according to claim 1, wherein:
   said host processing system further comprises a message queue; and
   the admission control gateway sorts messages according to priority and re-orders messages in the message queue, such that messages having an associated priority which is relatively higher than other messages in the stream are processed first.

4. A host processing system according to claim 1, wherein:
   at least one message in the stream includes as transmitted from a client system an indicator which has been previously assigned by said host processing system, and the admission control gateway filters the indicator from the at least one message and uses the indicator to determine priority.

5. A host processing system according to claim 1, wherein the admission control gateway:
   uses the indicator to distinguish a new, low-priority session represented by a message from sessions in-progress and new, high-priority sessions;
   determines whether a server has sufficient processing resources to process the new, low-priority session; and
   rejects in response to a negative determination the new, low-priority session.

6. A host processing system including admission control that selectively admits a messages in a stream of messages originating from at least one client system to a host, comprising:
   a resource monitor coupled to the host that measures processing resources of the host, the resource monitor providing an indication of processing resources available to the host; and
   an admission control gateway that receives both the stream of messages and the indication from the resource monitor, the admission control gateway
      determining whether each message in the stream corresponds to a session in-progress and, if a message corresponds to a session in-progress, responsively admitting the message to the host, and
      determining whether messages from the stream not corresponding to a session in-progress have been assigned priority status relative to other messages and, admitting messages which do have a corresponding priority status as new sessions;
   wherein the admission control gateway, in response to an indication from the resource monitor that processing resources available to the host are scarce, rejects messages not corresponding to a session in-progress and not having a priority status relative to other messages.

7. A host processing system according to claim 6, wherein the host processing system includes at least one server.

8. A host processing system according to claim 6, wherein the host processing system supports two web sites, each web site having a different associated level of service, and wherein:
   the admission control gateway, in response to an indication from the resource monitor that processing resources available to the host are scarce, rejects new sessions represented by messages corresponding to the second web site but admits new sessions represented by messages corresponding to the first web site.

9. A host processing system according to claim 6, further comprising means for determining, for each message which has an indication of priority relative to other messages, whether sufficient resources of the host processor are available for processing of a new session, and if insufficient resources of the host processor are available, for also interrupting and deferring a session of lower priority in-progress to make room for a session of higher priority.

10. A host processing system according to claim 6, wherein said host processing system provides at least three classes of service including at least two levels of priority in processing for a single web site.

11. A host processing system including admission control that selectively admits a messages in a stream of messages originating from at least one client system to a host, comprising:

a resource monitor coupled to the host that measures processing resources of the host, the resource monitor providing an indication of processing resources available to the host; and an admission control gateway that receives both the stream of messages and the indication from the resource monitor, the admission control gateway determining whether each message in the stream corresponds to a session in-progress and, if a message corresponds to a session in-progress, responsively admitting the message to the host, and determining whether messages from the stream not corresponding to a session in-progress have been assigned priority status relative to other messages as indicated by one of a cookie, a password, or a value from the list maintained by the admission control gateway, and, admitting messages which do have a corresponding priority status as new sessions;

a deferral manager that receives messages which have been rejected by the admission control gateway and that responsively determines a time when deferred messages can be processed by the host processing system;

wherein the admission control gateway, in response to an indication from the resource monitor that processing resources available to the host are scarce, rejects messages not corresponding to a session in-progress and not having a priority status relative to other messages, and, the deferral manager formats a deferral message sent to a client system to including an indication of the time, and stores a priority indicator corresponding to the deferral message for use by the admission control gateway upon a later re-submission of a rejected message, the priority indicator including at least one of a cookie stored on the client system, a password sent to the client system, and a list maintained by the admission control gateway.

12. A host processing system according to claim 11, wherein the deferral message is adapted to cause the client system to re-send a message to the host processor at the time when the deferred message can be processed by the host processing system.

13. A host processing system according to claim 12, wherein the deferral message includes a web page having a countdown time, the web page adapted to cause a browser of the client system to re-send a message to the host processor at the time when the deferred message can be processed by the host processing system.

14. An improvement in a host processing system that selectively admits incoming messages sent from a client system, the host processing system including at least one of software, firmware and hardware that effect admission control for a server, said improvement comprising:

determining whether incoming messages correspond to a session in-progress and admitting to the server those incoming messages which do correspond to a session in-progress;

for incoming messages not corresponding to a session in-progress, comparing current server processing resources with at least one predetermined parameter and responsively determining whether a session corresponding to the message can be processed without burdening server processing resources beyond an amount indicated by a predetermined parameter;

for incoming messages not corresponding to a session in-progress, determining whether the message has been assigned priority by said host processing system, and if the message has been assigned priority by said host processing system, then admitting the message as a new session; and deferring incoming messages which do not correspond to a session in-progress, have not been assigned priority by said host processing system and cannot be otherwise processed without burdening server resources beyond the amount indicated by a predetermined parameter.

15. An improvement according to claim 14, further comprising:

determining, with respect to a particular message having been assigned priority, whether sufficient processing resources are available to process a new session;

if sufficient processing resources are not available to process a new session, then determining whether processing resources are used by a session in-progress which has less priority than the particular message; and if processing resources are used by a session in-progress having less priority, interrupting such session and beginning a new session represented by the particular message.

16. An improvement according to claim 15, further comprising:

if processing resources are not used by a session in-progress having less priority, further increasing an indication of priority of the particular message, such that upon later re-submission of the particular message, an associated indication of priority will be relatively higher.

17. An improvement according to claim 16, further comprising:

for messages not admitted to the host processing system, inhibiting acceptance upon re-submission for at least a predetermined period of time.

18. An improvement in a host processing system that selectively admits incoming messages sent from a client system, the host processing system including at least one of software, firmware and hardware that effect admission control for a server, said improvement comprising:

determining whether incoming messages correspond to a session in-progress and admitting to the server those incoming messages which do correspond to a session in-progress;

for incoming messages not corresponding to a session in-progress, comparing current server processing resources with at least one predetermined parameter and responsively determining whether a session corresponding to the message can be processed without burdening server processing resources beyond an amount indicated by a predetermined parameter;

for incoming messages not corresponding to a session in-progress, determining whether the message has been assigned priority by said host processing system, and if the message has been assigned priority by said host processing system, then admitting the message as a new session; and deferring incoming messages which do not correspond to a session in-progress, have not been assigned priority by said host processing system and cannot be otherwise processed without burdening server resources beyond the amount indicated by a predetermined parameter;

wherein deferring includes assigning a time indicator to those messages which are deferred for later admission to the server on a priority basis, and transmitting an indication of deferral and the time indicator to a client system which originally sent a corresponding deferred message; and creating a priority indicator associated with deferred messages of prior deferral by said host processing system, the priority indicator adapted for use by said admission control gateway in determining whether a corresponding message has been assigned priority (previously by said admission control gateway).

19. An improvement according to claim 18, further comprising:

automatically causing a client system to re-submit a deferred message to a host at substantially the later time.

* * * * *